(12) United States Patent
Sfredel et al.

(10) Patent No.: US 10,508,427 B2
(45) Date of Patent: Dec. 17, 2019

(54) SAFETY CLEANOUT CAP

(71) Applicants: Costel Sfredel, Chicago, IL (US); Otilia Sfredel, Chicago, IL (US)

(72) Inventors: Costel Sfredel, Chicago, IL (US); Otilia Sfredel, Chicago, IL (US)

(*) Notice: Subject to any disclaimer, the term of this patent is extended or adjusted under 35 U.S.C. 154(b) by 39 days.

(21) Appl. No.: 16/010,457

(22) Filed: Jun. 16, 2018

(65) Prior Publication Data

US 2018/0347162 A1    Dec. 6, 2018

Related U.S. Application Data

(63) Continuation-in-part of application No. 15/194,907, filed on Jun. 28, 2016, now abandoned.

(51) Int. Cl.
*E03C 1/30* (2006.01)
*F16L 55/115* (2006.01)
*F16L 25/14* (2006.01)

(52) U.S. Cl.
CPC ............ *E03C 1/30* (2013.01); *F16L 55/1152* (2013.01); *F16L 25/14* (2013.01)

(58) Field of Classification Search
CPC .............................. E03C 1/30; F16L 55/1152
USPC ............................... 4/255.01–255.06; 285/15
See application file for complete search history.

(56) References Cited

U.S. PATENT DOCUMENTS 3,936,892 A * 2/1976 Miller .................... E03C 1/286
4/255.01

* cited by examiner

*Primary Examiner* — Christine J Skubinna
(74) *Attorney, Agent, or Firm* — Fraline J. Allgaier

(57) ABSTRACT

This safety cleanout cap system provides for the removal of water and debris from drains. It consists of a flow channel having sidewalls, a turning segment and a downward bend. The turning segment is on the same lateral plane as the safety cleanout cap and has left and right side depressions that extend above the downward bend. The depressions have tracks that are formed to diverge inwardly between top and bottom lateral edges and cooperatively receive and prevent tools from upward and downward movement along the sidewalls of the flow channel. The safety cleanout cap can be attached to pipe fittings in order to regulate the flow of fluid in compressed spaces.

1 Claim, 5 Drawing Sheets

SAFETY CLEANOUT CAP

RELATED APPLICATIONS

This application is a continuation-in-part of U.S. Utility patent application Ser. No. 15/194,907 filed Jun. 28, 2016, now pending.

BACKGROUND OF THE INVENTION

The present invention relates to the field of plumbing and drain cleanout devices. More particularly, the present invention pertains to an improved safety cleanout cap (hereinafter cleanout cap) having a permanently mounted flow channel, a turning segment and downward bend. The cleanout cap is adapted to connect to plumbing extensions for flushing water and debris from a drain in narrow, tight or constricted conditions by means of flow channel systems.

Cleanouts are access points or fittings for drain openings. These are specialized devices that maintain the integrity of a plumbing system over extended periods of time. Plumbing codes have requirements for the size, location, installation and maintenance of drainage pipe cleanouts. This is mainly dictated by the necessity to allow drain cleaning devices to have access to drainage pipes.

Most plumbing systems are designed by professionals who make cleanouts accessible by placing them at convenient intervals and with minimal disruptions to a building. For example, interior building drains can be routed in a manner that would not permit cleanouts to be located above or near high traffic areas, electrical boxes, large mechanical units or equipment that would require removal before accessing the drainage system.

The release of sewer into a home or public building can pose serious health risks. The sewer can vary from clean water to raw sewage that contains fecal matter, bacteria, viruses and other hazardous microorganisms. Lay individuals might not take the proper precautions when dealing with sewage or use proper sanitizing procedures after sewage is released. The release of sewage-contaminated water can also expose individuals to illnesses such as *Salmonella, Shigella, E. coli* and hepatitis A. These diseases can later transfer from person-to-person.

Additional dangers after a release or water of sewage from drainage pipes include electrocutions, explosions, fire, gas release, flooding, destruction of valuables and serious damage to infrastructure. In the case of electrocutions or release of gas, wires or gas lines might come into direct contact with standing water or soggy materials. A utility company might not be available to immediately shut off gas or electrical lines. In addition, an on-site professional might not be available to assess an affected area for potential electrical shocks and additional gas leaks. This puts homeowners, plumbers or other individuals in serious and potentially fatal situations.

Most cleanouts have removable elements such as caps or plugs that permit access to drains. These elements minimize the requirements of removing additional plumbing fixtures in order to clear water or debris from a drainage system. The relative load of weight of most drainage systems could include 100 to 200 gallons of water. The overflow water from the drain stoppage can cause serious bodily harm to a plumber, other individuals and property. The release of hot water, dead organic waste, harsh chemicals or sewer gas in a drainage system can further escalate the harm.

The safety cleanout cap as described herein will assist plumbers with the removal of cleanout cap devices in tight or compressed spaces, assist with drainage and promote the horizontal or vertical flow of water or sewer towards the exterior of a building. The device is simple to install and operate. In both vertical and horizontal arrangements of the pipes, the release of a valve creates the negative pressure to help clear a drainage system before a plumber arrives. The vertical and horizontal flow of debris and water is effective and would prevent potential flooding and release of toxic materials in a plumber's workspace.

Various devices for flushing and removing obstructions in waste pipes or sinks by means of a tube connected to a water main exist in the prior art. The multi purpose cleanout attachment (U.S. Pat. No. 3,936,892A) provides for a plumbing fitting that can be installed along any drain line to permit easy flushing in the event of a clog. A length of pipe having interior and exterior threading is connected to the drain by means of an external screw thread at one end and an internal screw thread at the opposite end. A branch line connected to one side of the attachment and is adapted to receive a cleanout rod. This device is not designed to facilitate the cleanout process in cramped spaces or allow for the pre-release of water and debris before addressing clogs in drainage systems.

The flushing attachment for sinks (U.S. Pat. No. 831,722A) was invented in 1905. The flushing attachment consists of a branch pipe located on an outlet-pipe between the trap and the sewer. The branch pipe has a valve-inlet opening which is normally closed but is adapted to be connected to the inlet end of the branch pipe and to be secured to either the hot or cold water faucet located adjacent the outlet-pipe. A valve in the branch and water lines can be released into the outlet-pipe below the trap. This flushing attachment for sinks is not practical on a larger scale and in drainage problems in toilets, sewers and other drainage scenarios that would require a cleanout cap. As shown, it is used mainly for clogs in sinks whereby the hose is held in position between a faucet and the branch of the outlet-pipe and is thereby secured to both.

The decorative and magnetic cleanout caps presented in United States patent application number 20160138748A1 comprise a cap portion and a magnet. A magnet is coupled to the cap portion of the cleanout cap and can magnetically engage with a cleanout engagement device. This device does not have the practical safety and reach features that would be necessary in emergency situations. The cap portion of the device is configured to hide a drain cleanout until access is required.

U.S. Pat. No. 976,593A provides for a cleanout attachment for bath wastes and overflows by cleaning the connecting sections between the bath waste and overflow. The waste pipe as described was a cleanout device having a rod formed with traversely extending cross bars. The cleanout device is connected to the outside of a stopper having apertures for the connection of the rod. The cleanout attachment is used to clean the connecting sections between the bath waste and the overflow. It is not used to access and direct the flow of waste and water outside of the drainage system.

Various devices have been invented to sieve the debris and other particulates from a direct flow of water from drainage pipe systems. The debris collector for water drainage pipes was described in U.S. Pat. No. 3,465,885A. The device features the combination of a debris collector unit and drainage means. The drainage functions as a pipe with an outlet that transports waste and other deposits to a base structure. The base structure is a primary passageway for fluid. This debris collector arrangement from waste drainage pipes does not provide the convenient connections and access points to sewer systems for further sewer cleaning and maintenance.

Cleanout caps and plugs are offered commercially in multiple sizes to fit various types of plumbing arrangements. Some are offered as slotted cleanout caps for flush applications that require a flush-finish on walls and sidewalks. Additional commercial applications include counter sunk cleanout caps and raised head cleanout caps. However, these applications would first require the removal of the cleanout cap and any sewage, water or debris would be drained in a pan or bucket. Removal of the cleanout cap would also pose additional problems in narrow, tight or constricted conditions.

To this end, there is a long felt need in the art for a new cleanout cap that is adapted to prevent damage to infrastructure or the spread of diseases is presented. The present invention helps to overcome the problems associated with operating the traditional cleanout cap by allowing a user to flush water and debris from a drain in narrow, tight or constricted conditions without first removing a cleanout cap. In the event that a drain is routed in close proximity to a wall, machinery, electrical outlets or other types of obstructions, water and debris can be drained out of a backed up drain without causing damage and possibility spreading disease and other bacteria or viruses to areas that are in close vicinity to the drain.

Access to drainage cleanouts is also becoming a relevant issue as many states continue to regulate and propose additional water legislations. There is a need for a more efficient cleanout system as states regulate water flow rates for various plumbing fixtures. State officials can also require the quick and efficient removal of any cleanouts to determine if an entire drainage system is in compliance with state code. Therefore, testing might require that the traps of an entire drainage system are filled with water and individual cleanout caps would be removed in a quick and efficient manner. These testing conditions can include restaurants, hospital rooms, schools, libraries, computer rooms and other areas that would require minimal spillage of water and debris.

In the case of serious plumbing defects or plumbing components that have been installed incorrectly, the invention as described herein can be employed. For example, an outdated plumbing system in commercial office buildings can have cleanout caps positioned eight feet above the ground and on top of large electrical transformers. This positioning and the subsequent release of water and debris could be a life threatening experience for a plumber. The best approach would be to cut the drain line a long distance away from the original cleanout location and reconstruct a safer cleanout system.

The work of a plumber is often a messy and time-consuming experience. The diversity of the every day water supply systems and the debris, disease, bacteria, viruses and other toxic substances in drainage systems makes the work even more dangerous. The cleanout cap as described herein is a modern approach to an age-old problem with drainage systems. A plumber can work with the security that one of the most life risking parts of the job has greatly been lowered.

BRIEF SUMMARY OF THE INVENTION

In view of the foregoing disadvantages associated with cleanout caps, the improved cleanout cap of the present invention provides an improved system for closing a drain opening. As such, the general purpose of the present invention is to provide a new and improved safety cleanout cap having a permanently mounted flow channel, a turning segment and downward bend is presented. The turning segment would prevent plumbing tools and additional devices from slipping and spinning after being exposed to water, dirt or other damp media.

Another objective of the present invention is to provide a safety cleanout cap for a drain system having a downwardly opening flow channel being mounted permanently within the opening of the cleanout cap. The flow channel is oriented at a downward angle relative to the opening of the cleanout cap. Inwardly curved depressions on opposite sides of the turning segment cooperatively receive plumbing tools in a clearance sufficiently spaced to remove the cleanout cap. The flow channel feature cooperatively provides a plumber with an angular reach and displacement of plumbing tools in a tight or compressed setting.

Still another objective of the present invention is to have a safety cleanout cap that can be attached to fittings and pipe sections in order to regulate the flow of fluid from a drainage system in compressed areas. The fittings, pipe sections and hose sections would further regulate and prevent the release of water and debris from a drainage system.

Henceforth, a cleanout cap that allows a plumber to easily remove a cleanout cap would fulfill a need in the plumbing industry. This invention utilizes and combines known technologies in a new configuration in order to overcome a long felt need in the art.

Additional advantages of the invention will become apparent from the following detailed description taken in conjunction with the accompanying drawings.

DETAILED DESCRIPTION OF THE INVENTION

Figure 1:
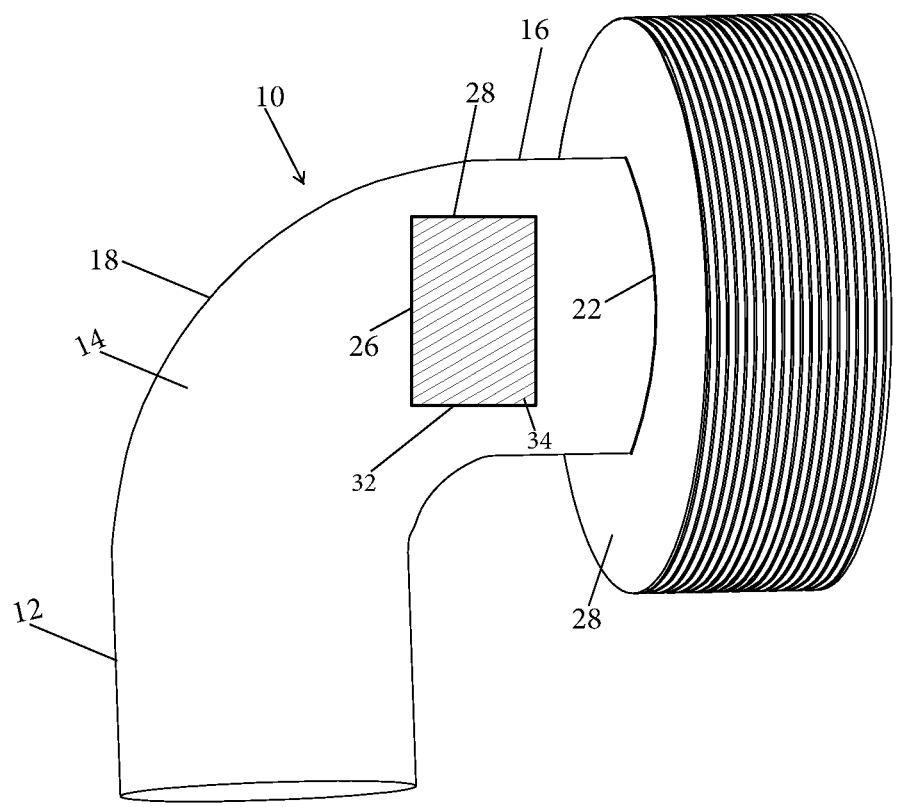
FIG. 1 is right side view of the safety cleanout cap.

A safety cleanout cap 10 having a permanently mounted flow channel 12, a turning segment 16 and downward bend 18 is presented. The present invention derives from the recognition that access to cleanout caps 10 is directed by the size, angle, location and access point of a drain system. The quick removal of various parts of a plumbing fixture including cleanout caps 10 in tight or constricted spaces can be advantageous. This would provide relief to plumbers and related professions by providing and employing a cleanout cap 10 that is designed to provide easy access in case of clogs both inside and outside of a building.

Figure 2:
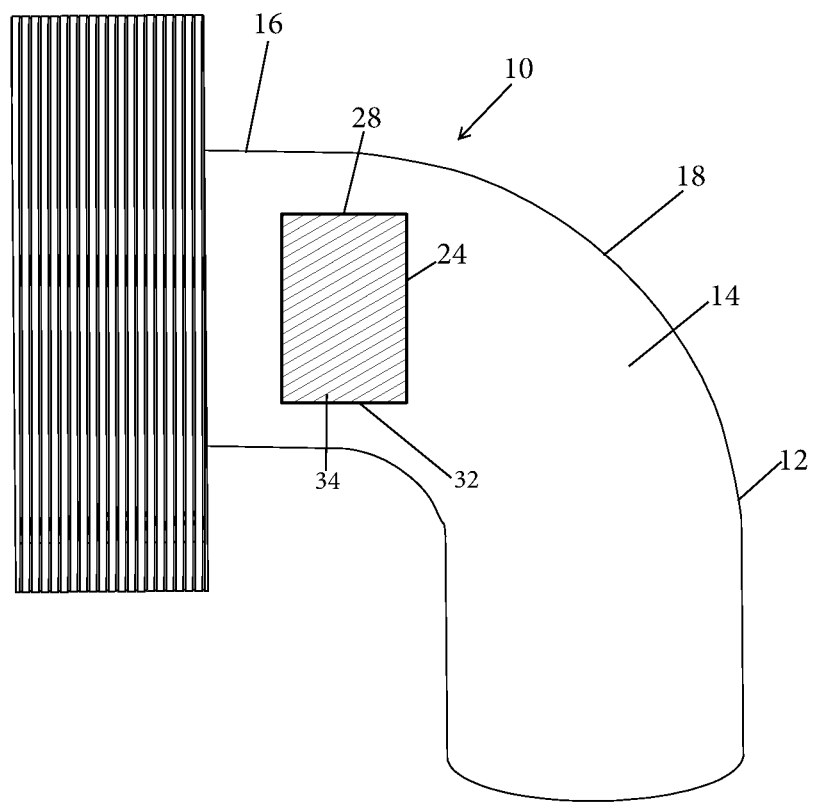
FIG. 2 is a left side view of the safety cleanout cap.
Figure 3:
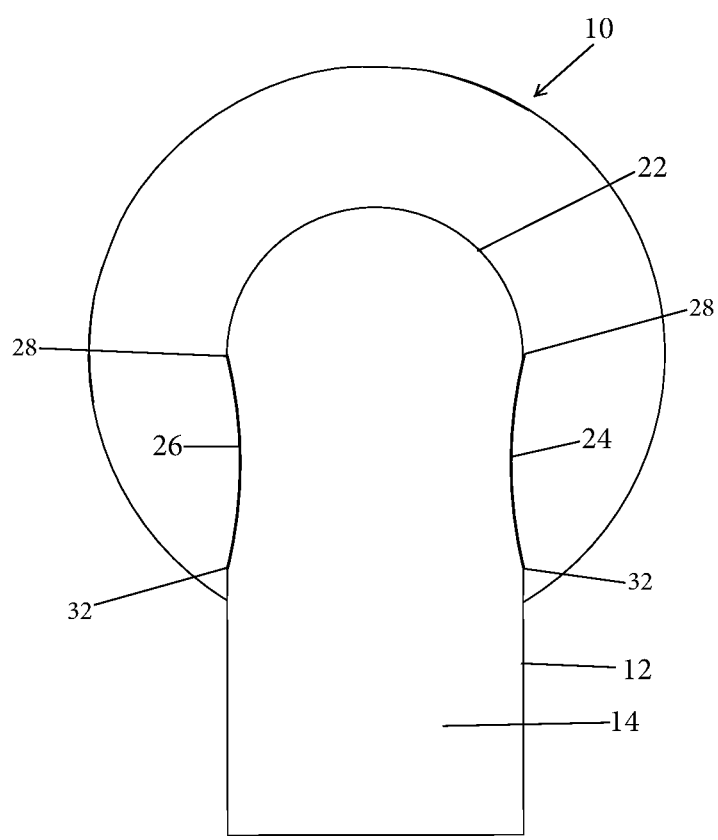
FIG. 3 is a back view of the safety cleanout cap.
Figure 4:
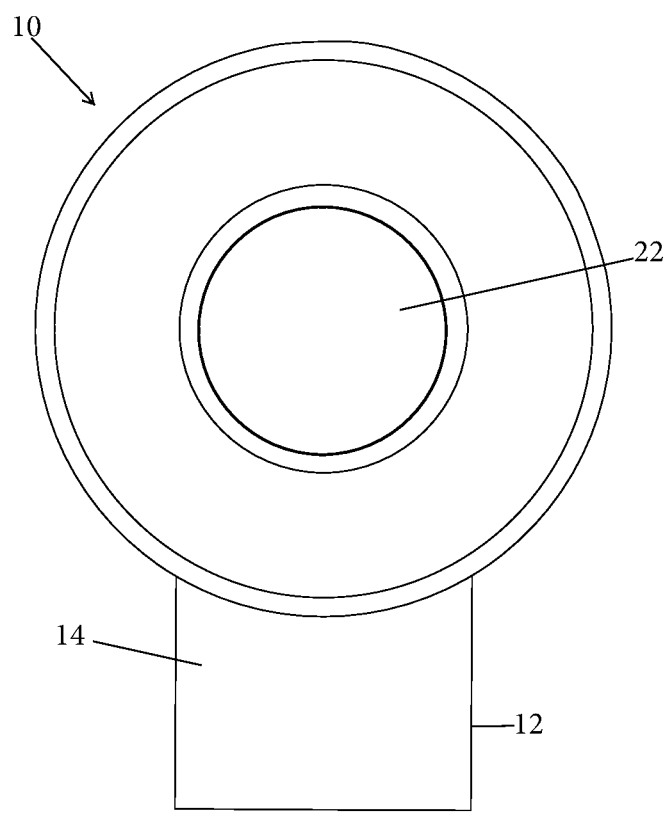
FIG. 4 is a front view of the flow channel.
Figure 5:
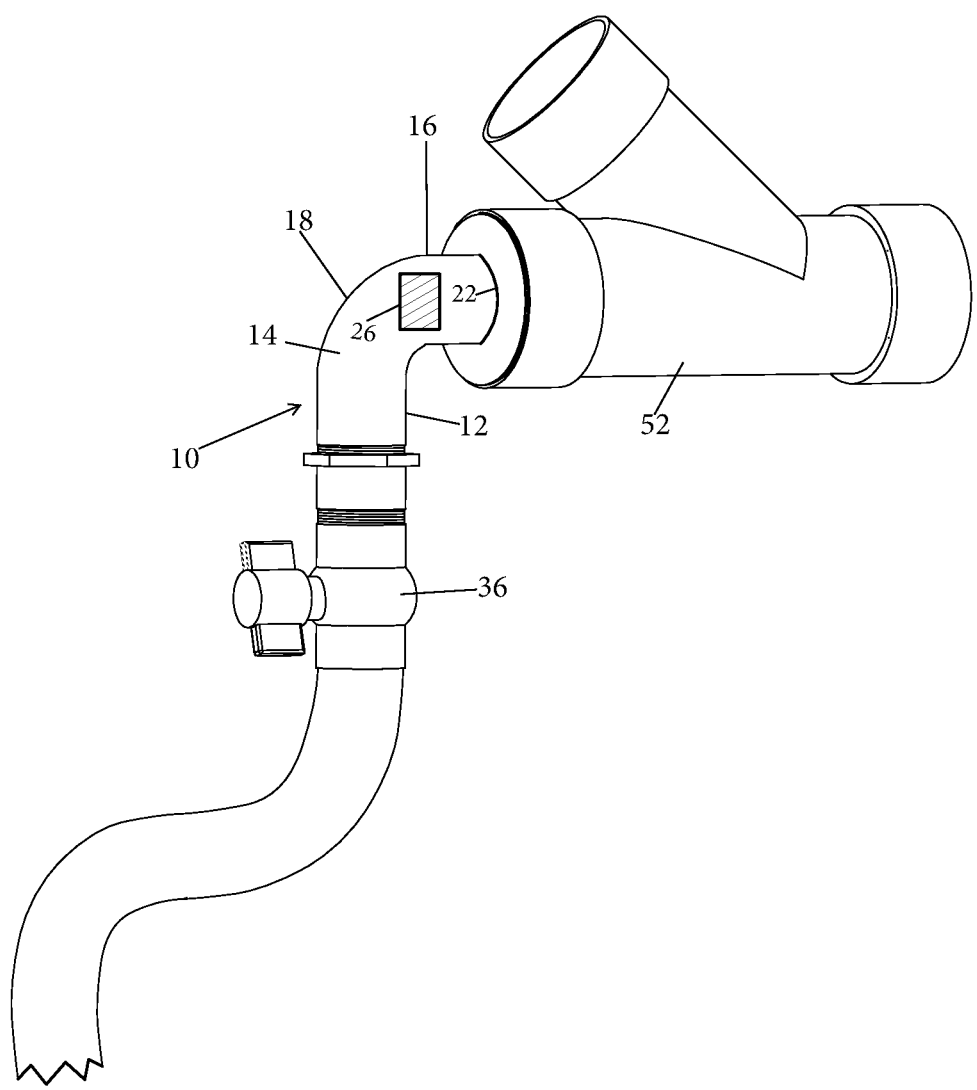
FIG. 5 is an exemplary view of the safety cleanout cap being attached to pipe fittings.

In reference now to the drawings, which shows the preferred embodiment of the cleanout cap 10, and which should not be construed as limiting to shape size and form, the first embodiment of a novel cleanout cap 10 having a flow channel 12 is indicated in FIGS. 1 to 6. The safety cleanout cap 10 features a flow channel 12 for drain systems further comprising the flow channel 12 being permanently mounted within the opening 22 of the cleanout cap 10. The cleanout cap 10 having sidewalls 14, a turning segment 16, and downward bend 18.

The turning segment 16 extends above the downward bend 18 of the flow channel 12 and is on the same lateral plane as the safety cleanout cap 10. The right side depression 24 and the left side depression 26 are curved inward of the sidewalls 14 and are mounted on the opposite sides of the flow channel 12. The depressions further feature a top lateral edge 28, a bottom lateral edge 32 and interior tracks 34. The interior tracks 34 are formed to diverge inwardly between the top lateral edge 28 and the bottom lateral edge 32. The right depression 24 and the left side depression 26 have a substantially rectangular shape and cooperatively receive and prevent tools from upward or downward movement along the sidewalls 14 of the flow channel 12.

The flow channel 12 is generally circular and can provide clearance for receipt of water and debris from a drain. It is further adapted to receive tools for removal of debris from a drain. The types of tools can include cleanout plug wrenches, pipe wrenches, pullers, reseaters, fitting removal tools and 4-way wrenches. For example, the jaw of a pipe wrench can easily grab both depressions and with a slight wedging action, the cleanout-cap 10 is tightened or loosened away from a drainpipe.

The safety cleanout cap can be attached to pipe fittings 36 in order to regulate the flow of fluid from a drainage system in compressed areas. The pipefittings 36 can include pipe sections and hose sections that can be attached to the flow channel to further regulate and prevent the release of water and debris from a drainage system. This feature is particularly helpful in multi-story buildings or in situations where a drainage system is designed above electrical units or sensitive areas within a building.

The water released from a drainage system can include urine, laundry waste and various types of dissolved or suspended impurities. Various types of debris components that can be extracted from a sewer line include feces, sanitary towels, plastics, garden waste and food particles.

What is claimed is:

1. A safety cleanout cap with an attached flow channel being permanently mounted within the opening of said safety cleanout cap, said safety cleanout cap further comprising:
   said flow channel having sidewalls, a turning segment and a downward bend; said turning segment being on the same lateral plane as said safety cleanout cap and having a right side depression and a left side depression; said right side depression and said left side depression extending above the downward bend of said flow channel and being centrally disposed in said sidewalls of said flow channel, said right side depression and said left side depression being curved inward of said side walls and being mounted on the opposite sides of said flow channel, said right side depression and said left side depression having a top lateral edge and a bottom lateral edge, said right side depression and said left side depression having tracks being formed to diverge inwardly between said top lateral edge and said bottom lateral edge, said right side depression and said left side depression having a substantially rectangular shape and cooperatively receiving and preventing tools from upward and downward movement along said sidewalls of said flow channel; said safety cleanout cap being attached to pipe fittings in order to regulate the flow of fluid.

\* \* \* \* \*